UNITED STATES PATENT OFFICE.

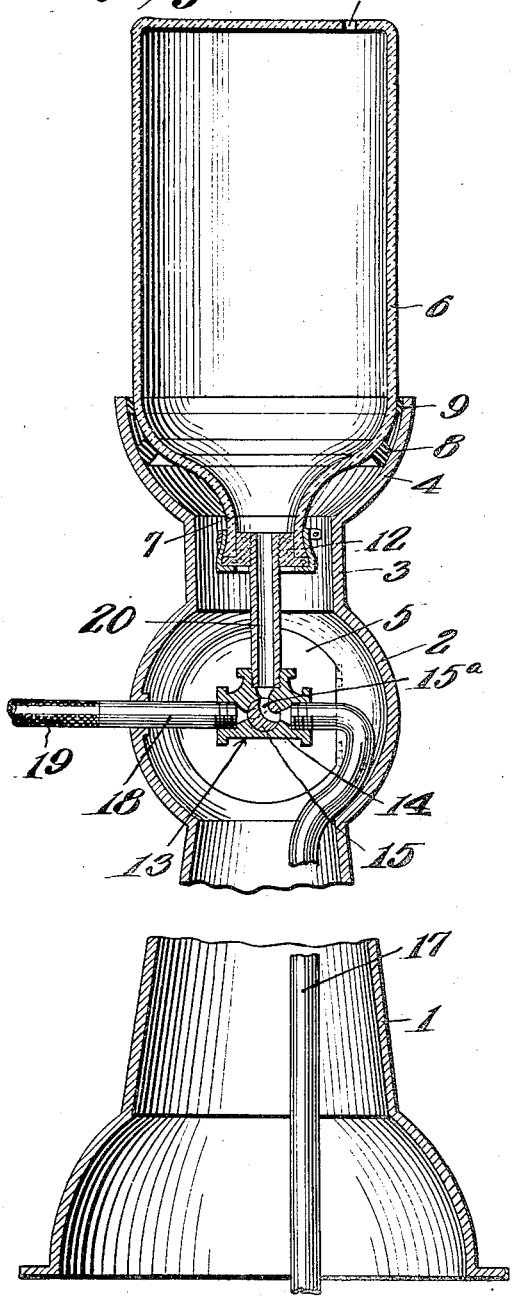
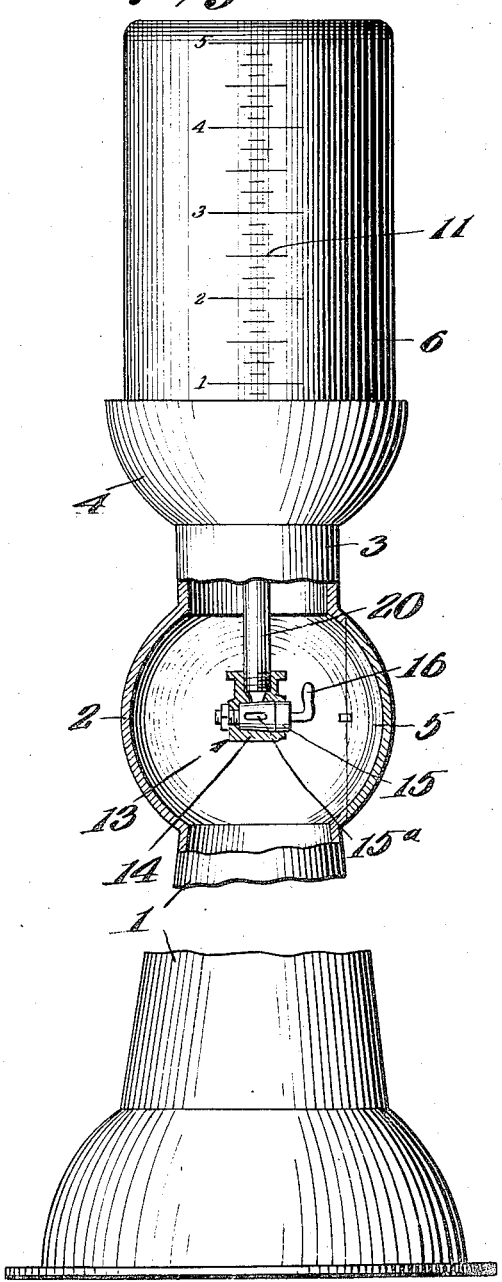

CHARLES B. SPRAGUE, OF PENN YAN, NEW YORK.

MEASURING AND DISPENSING DEVICE.

1,171,550.  Specification of Letters Patent.  Patented Feb. 15, 1916.

Application filed October 26, 1914. Serial No. 868,727.

*To all whom it may concern:*

Be it known that I, CHARLES B. SPRAGUE, a citizen of the United States, residing at Penn Yan, in the county of Yates and State of New York, have invented a new and useful Measuring and Dispensing Device, of which the following is a specification.

The present invention appertains to a liquid measuring and dispensing device, and aims to provide a novel and improved apparatus which is particularly adapted for measuring gasolene and for supplying a predetermined quantity thereof to the fuel tank of an automobile or motor vehicle, although the present device may be employed for measuring and dispensing various other liquids.

The present invention contemplates the provision of an appliance of the nature indicated, embodying a unique assemblage of component parts, and which is improved generally in construction, to enhance the utility of the device, and to render the same comparatively simple and inexpensive in construction as well as convenient, practical and efficient in use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a vertical section of the device, parts being broken away. Fig. 2 is a side elevation of the device, parts being broken away, and the line of view being at right angles to the line of view in Fig. 1.

The body of the present device comprises a hollow pedestal 1, which is preferably tapered upwardly, and which is in the form of a casting, although it may be otherwise constructed. The pedestal 1 is provided adjacent its upper end with an enlarged portion or swell 2, from which rises a neck 3, and the neck 3 is surmounted by a bowl-shaped portion 4. The said parts are preferably integral, and the enlarged portion 2 which is preferably spherical, is provided at one side with a circular hinged door 5 to permit access to be had into the interior of the enlarged or bulged portion 2. The pedestal is of proper height for the intended purpose, and may be mounted upon the floor or other surface.

There is provided a measuring receptacle, which is in the form of an inverted relatively large bottle 6, constructed of glass or other transparent material, and which has its neck 7 depending within the neck 3 of the pedestal, while the shoulder of the bottle or receptacle 6 is disposed within the bowl-shaped portion 4 and seated upon an annular gasket or segment 8 secured within the rim of the portion 4. A second annular gasket or ring 9 is preferably secured within the rim of the portion 4 directly adjacent the edge thereof, to assist in holding the bottle or receptacle in vertical or upright position. The bottle or receptacle 6 is provided with an upper vent 10, and is provided at one side with a suitable graduated scale 11 to indicate gallons or other units of measurement. A suitable apertured stopper 12 is secured within the neck 7 of the bottle or receptacle 6.

Disposed centrally within and housed or inclosed by the enlarged portion 2 of the pedestal, is a three-way valve 13, which embodies a horizontally disposed T-shaped valve casing 14 through the central portion of which is journaled for rotation a spigot or plug 15 having a lateral arcuate passage 15ª. That end of the spigot or plug 15 adjacent the door 5 is provided with a handle 16, whereby the spigot or plug may be manually rotated when the door 5 is opened. The valve casing 14 is preferably disposed parallel with the door 5 when closed, and the lateral arm or branch of the valve casing projects upwardly, while the ends of the valve casing project toward opposite sides of the enlarged portion 2.

A gasolene or liquid supply pipe 17 projects upwardly within the pedestal 1, and has its upper or discharge end threadedly or otherwise engaged in one end of the valve casing 14, while an outlet or discharge pipe 18 is engaged into the other end of the valve casing 14 and projects through the corresponding side of the enlarged portion or housing 2. The pipe 17 is extended to an elevated gasolene tank (not shown), in order that the gasolene may be delivered by gravity, or the pipe 17 may be extended to a pump, or delivering the gasolene through the pipe 17 under pressure, whichever is desired. To the other end of the discharge pipe 18, is attached a hose 19 which may be extended to the tank of an automobile or motor vehicle, or to the vessel or container which is to be supplied with gasolene or other liquid. An upstanding pipe 20 has its lower end threadedly or otherwise engaged into the upstanding arm or branch of the valve casing 14, and the upper end of the pipe 20 passes snugly through the aperture of the stopper or plug 12 to communicate with the interior of the bottle or receptacle 6. When the spigot or plug 15 is swung to one position, as seen in Fig. 1, the passage 15ª thereof will establish communication between the adjacent ends of the supply pipe 17 and the upstanding pipe or branch 20 leading to the receptacle or bottle 6, and when the plug or spigot 15 is turned through a quarter revolution, the passage 15ª thereof, will establish communication between the pipe 20 and the outlet or discharge pipe 18.

In use, it being understood that the pipe 17 is connected to a suitable source of gasolene or other liquid to be dispensed, when the plug or spigot 15 is turned in one direction, to the position illustrated in Fig. 1, the gasolene will flow through the valve from the pipe 17, and upwardly through the pipe 20 into the receptacle or bottle 6. The receptacle or bottle 6 may then be filled up to the level desired, the quantity of liquid within the bottle being indicated upon the scale 11, so that the supply of liquid may be shut off whenever the predetermined amount of liquid has been admitted into the bottle. Then, by turning the plug or spigot 15 properly to bring the passage 15ª thereon into registration with the pipes 20 and 18, the contents of the bottle 6 will be discharged through the pipe 18, and may be directed into the fuel tank of the automobile or motor vehicle by means of the hose or flexible conductor 19.

It will be evident that the valve 13 may be readily controlled when the door 5 is opened, and ordinarily, the door 5 when closed may be locked in such condition to prevent unauthorized or maliciously inclined persons from tampering with the device. The pedestal 1 is of sufficient height, in order that the bottle 6 and its discharge means are located at a sufficient height above the fuel tank or other container into which the liquid is to be discharged, whereby the liquid may readily flow by gravity from the bottle into the fuel tank or other container.

With the present device, the provision of the bottle 6 enables the attendant or purchaser to observe the bulk of the liquid, and in this manner the attendant or customer may observe the cleanliness, color and quality, as well as the quantity of liquid being purchased.

As will be evident, the vent 10 of the bottle 6 will enable the liquid to flow into and out of the bottle 6, inasmuch as the vent permits of the ingress and egress of air, but does not permit an unrestricted passage of dust or other foreign matter into the bottle, which might contaminate the gasolene or other liquid.

The present device may be constructed in various sizes and when the bottle 6 is empty, the same may be removed vertically, for the purpose of cleaning or the purpose of replacement by a different sized bottle or vessel.

Having thus described the invention what is claimed as new is:—

A measuring and dispensing device, embodying a hollow pedestal having a bowl-shaped portion at its upper end, a pair of annular gaskets secured within said portion, an inverted bottle having an upper vent and having its shoulder seated upon one of said gaskets, the bottle fitting within the other gasket to hold the bottle upright, the bottle having a neck depending within the pedestal, an apertured stopper fitting within the neck, a three-way valve disposed within the pedestal and having a handle, the pedestal having a door in front of said handle adapted to be opened for permitting access to be had to the handle, an upstanding pipe attached to said valve to enter said stopper, a supply pipe extending upwardly within the pedestal and connected to said valve, and a discharge pipe connected to said valve and extending through one side of the pedestal.

In testimony that I claim the foregoing as my own, I have hereto affixed my signature in the presence of two witnesses.

CHARLES B. SPRAGUE.

Witnesses:
 B. T. MALLORY,
 CHAS. HUNTER, Sr.